United States Patent [19]

Yasutomi

[11] Patent Number: 5,484,150
[45] Date of Patent: Jan. 16, 1996

[54] CASTER BASE ASSEMBLY FOR LOAD CARRYING WHEELERS

[75] Inventor: Shinobu Yasutomi, Shizuoka, Japan

[73] Assignee: Yazaki Industrial Chemical Co. Ltd., Shizuoka, Japan

[21] Appl. No.: 228,532

[22] Filed: Apr. 15, 1994

[51] Int. Cl.⁶ ......................................................... B62B 3/02
[52] U.S. Cl. ...................... 280/79.3; 280/47.34; 211/182; 248/68.1; 403/391
[58] Field of Search .................................... 280/79.11, 64, 280/35, 43.16, 638, 79.3, 47.34; 16/18 R, 19, 30, 29, 31 R; 108/54.1, 56.3; 248/68.1, 231.5; 211/182; 403/391

[56] References Cited

U.S. PATENT DOCUMENTS

| 2,782,045 | 2/1957 | Hulbert | 16/30 |
|---|---|---|---|
| 4,227,281 | 10/1980 | Chung et al. | 16/30 |
| 4,512,591 | 4/1985 | Plante | 280/79.11 |
| 5,257,794 | 11/1993 | Nakamura | 280/79.3 |

FOREIGN PATENT DOCUMENTS

| 2174295 | 11/1986 | United Kingdom | 16/19 |
|---|---|---|---|

Primary Examiner—Karin L. Tyson
Assistant Examiner—Carla Mattix
Attorney, Agent, or Firm—Eric P. Schellin

[57] ABSTRACT

An assembly capable of accommodating casters having a different attaching-bolt pitches to a load carrying wheeler is disclosed, which includes two segmented halves of a pair of sleeves each composed of a mouth to receive therein ends of horizontally spaced tubular crossbeams and segmented halves of a caster-attaching block interposed between each sleeve pair. The blocks have a plurality of elongated bolt holes in the direction perpendicular with the axis of the sleeves, laid out end-to-end, so as to accommodate a range of caster-bolt pitches, and at least a pair of elongated bolt holes in the direction parallel with the sleeves' axis, also provided to accommodate a range of bolt pitches for a caster being attached to the base of the wheeler's rectangular framework. The segmented sleeves are made to slide closer or farther away from each other, so that the spacing of bolt holes across the segments can be adjusted to meet a wide range of caster-bolt pitches.

1 Claim, 7 Drawing Sheets

F I G. 9
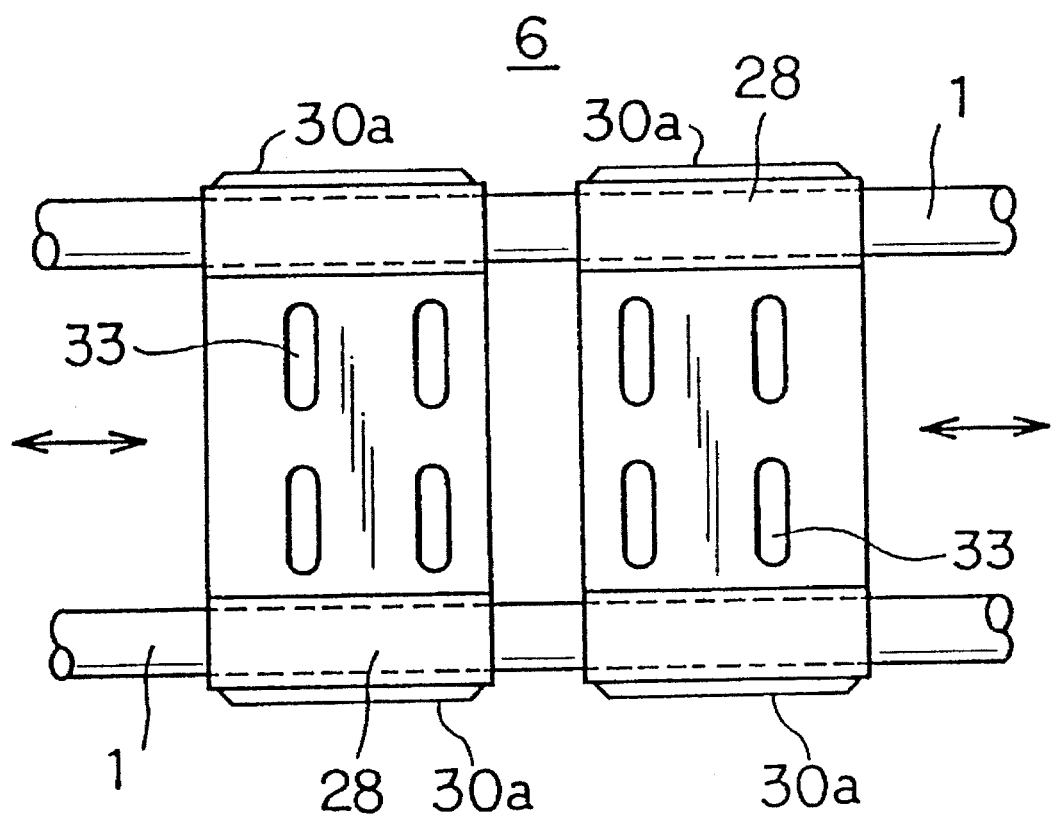

CASTER BASE ASSEMBLY FOR LOAD CARRYING WHEELERS

BACKGROUND OF THE INVENTION

1) Field of the Invention

This invention relates in general to an assembly for bolting a caster to the framework base of platform trucks and wheeled rack units, and more particularly to such an assembly having sleeves each having a mouth to receive therein ends of a horizontally spaced pair of parallel tubular crossbeams, to form a rectangular framework's one side, and another tubular crossbeam extended perpendicularly with the crossbeam pair, to form the framework's other side.

2) Description of the Prior Art

There have been developed a variety of caster mounting bases for platform trucks, works trolleys and other wheeled load carriers, in which casters are mounted for wheeling and which also serve as corner joints. A typical mounting base, as disclosed in Japanese laid-open patent application 4-79771, has a horizontally spaced pair of parallelly extending sleeves, each having a mouth to receive therein ends of a pair of crossbeams, and another horizontal sleeve extended perpendicularly with the first sleeve pair and having another mouth into which an end of a third crossbeam is inserted. With this arrangement, four such mounting bases assemble crossbeams into a rectangular platform framework for wheeled load carriers.

However, the prior-art caster mounting bases for wheeled load carriers have proved to pose at least one major drawback, because of their possible failure to find a matched caster in terms of bolt pitch. Manufactures of platform trucks normally purchase casters which are assembled onto their trucks at the factories. Their concern is, however, that the bolt pitch of casters bought or ordered from outside producers may not fit that of bolt holes bored in their mounting bases.

One solution, if this happened, is to go and seek a matched caster in the market, which is time consuming. Another solution is to have a mounting base bored to have a multiple number of bolt holes in advance, in the hope that the selected combination of holes can find a matched caster.

The present invention has been proposed to eliminate the above-mentioned difficulty of conventional bold mounting bases.

SUMMARY OF THE INVENTION

It is therefore a primary objective of the present invention to provide an assembly for mounting a caster at the corners of a rectangular platform truck framework and having pairs of elongated bolt holes, the two holes in each pair laid out end-to-end so as to offer a variable range of caster-bolt pitches.

Another objective of the present invention is to provide such an assembly having a pair of sleeves each having a mouth to receive therein ends of a horizontally spaced pair of parallel crossbeams to provide one side of a rectangular framework for load carriers, and another sleeve also having a month to receive therein an end of a third horizontal crossbeam extended perpendicularly with the first crossbeam pair to another framework side, to thereby serve as a corner joint as well.

A further object is to provide a caster mounting base in two segments which are made slidable closer or farther away from each other and each having pairs of elongated bolt holes, the two holes in each pair laid out end-to-end so as to meet a wide adjustable range of caster-bolt pitches. With a given caster, first the segments are moved for rough adjustment, and then the right combination of holes is selected from the pairs for fine adjustment.

BRIEF EXPLANATION OF THE ACCOMPANYING DRAWINGS

FIG. 5 is a perspective view of the caster mounting base of FIG. 4, with the caster mounted on;

Figure 3:
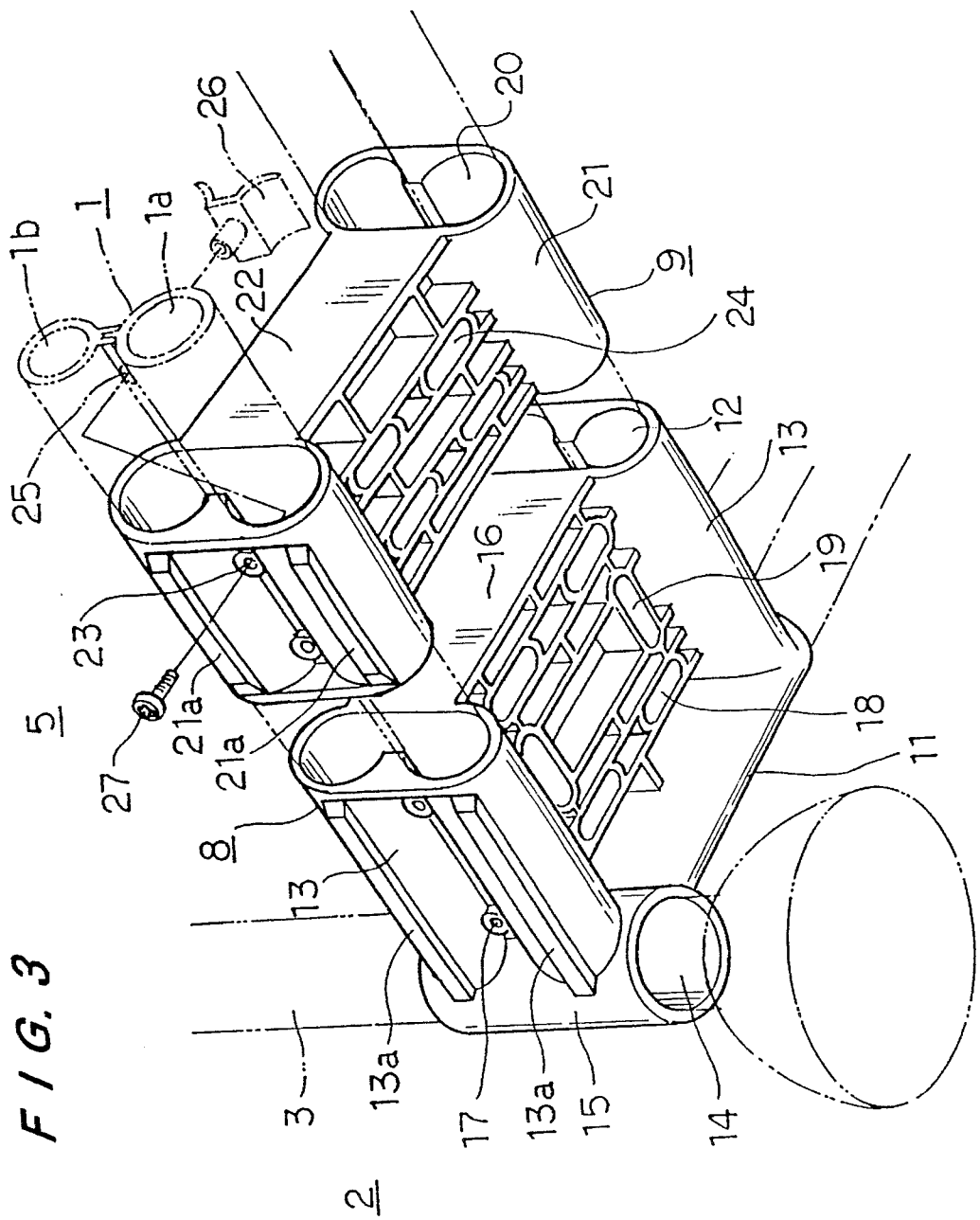
FIG. 3 is a partly exploded, perspective view of a corner of the platform framework where the caster mounting base of FIG. 1 is mounted, but with the caster being removed.
Figure 6:
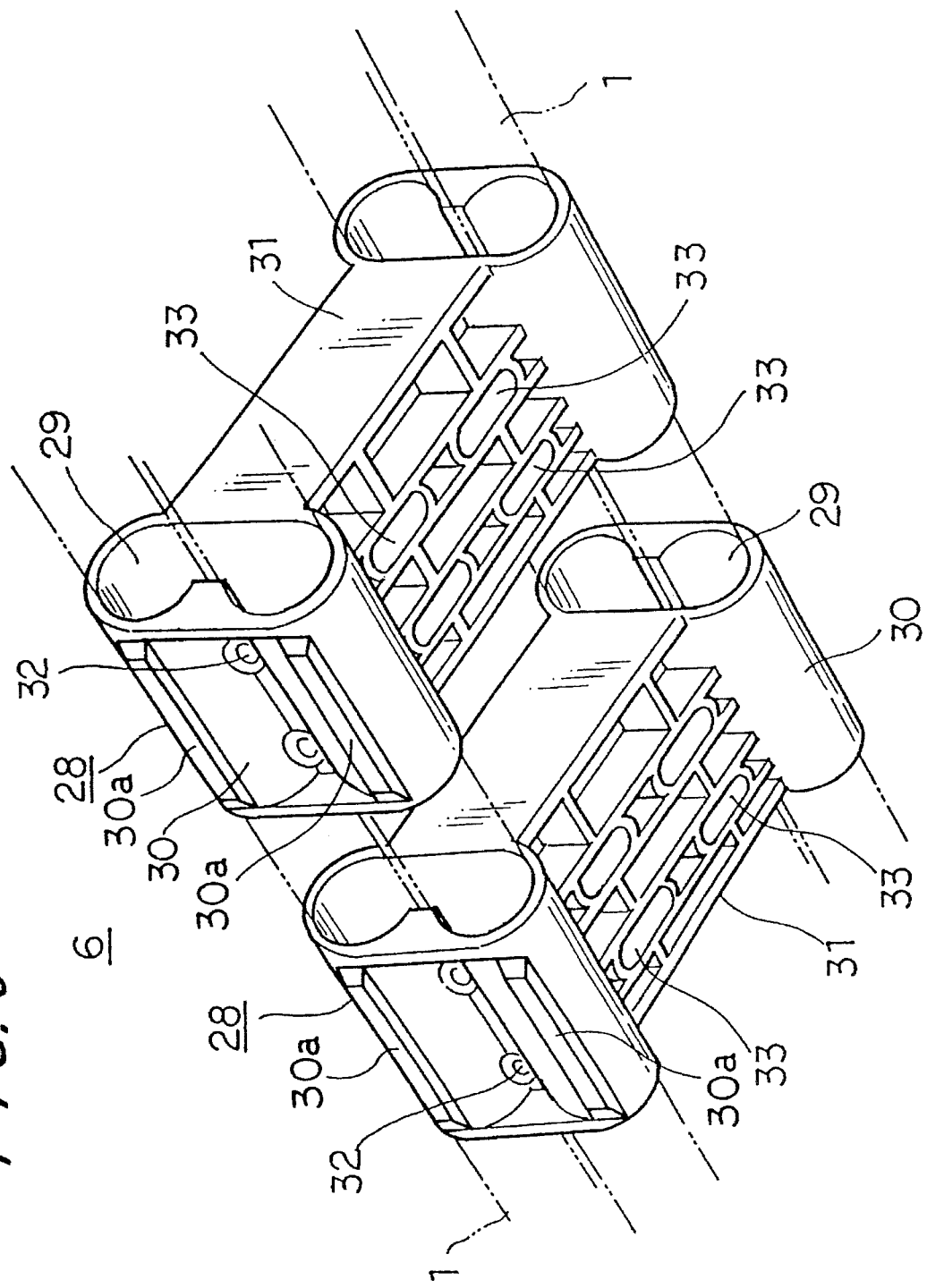
FIG. 6 is a perspective view of a second preferred embodiment of the present invention composed of segmented halves of a caster mounting block made slidable to closer or farther away from each other to offer a wide range of caster-bolt pitches.
Figure 7:
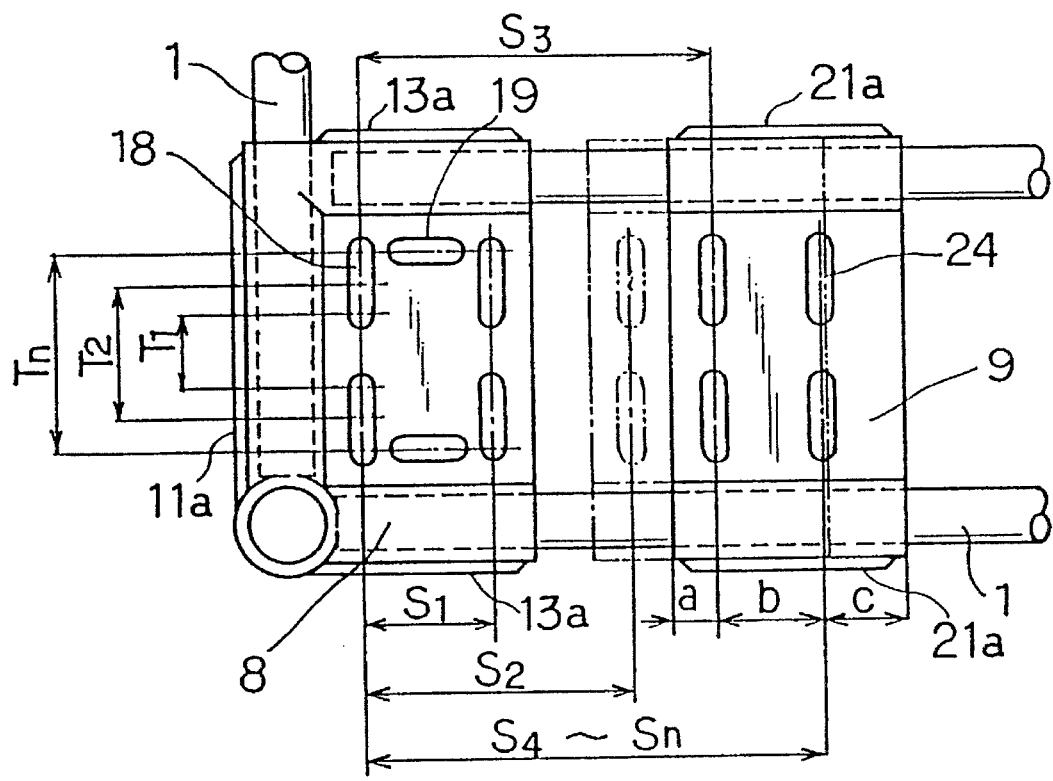
Figure 8:
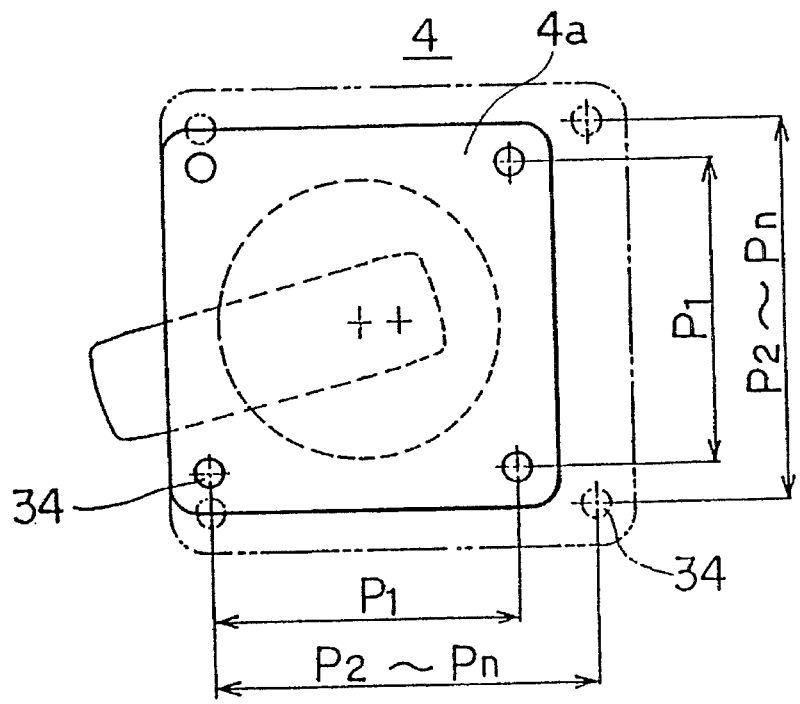

FIG. 7 an explanatory plan view of the corner caster mounting base illustrated in FIG. 3, in which a pair of elongated bolt holes offer a wide range of caster-bolt pitches;

FIG. 8 is an explanatory plan view of the attaching plate of a caster, showing the pitch of bolts securing a caster to the mounting base of FIG. 3, and FIG. 9 is an explanatory plan view of the caster mounting base of FIG. 6.

DETAILED DESCRIPTION OF PREFERRED EMBODIMENTS

Preferred embodiments of the casters for platform trucks and other load carrying wheelers will be described in full detail in conjunction with attached drawings.

Figure 1:
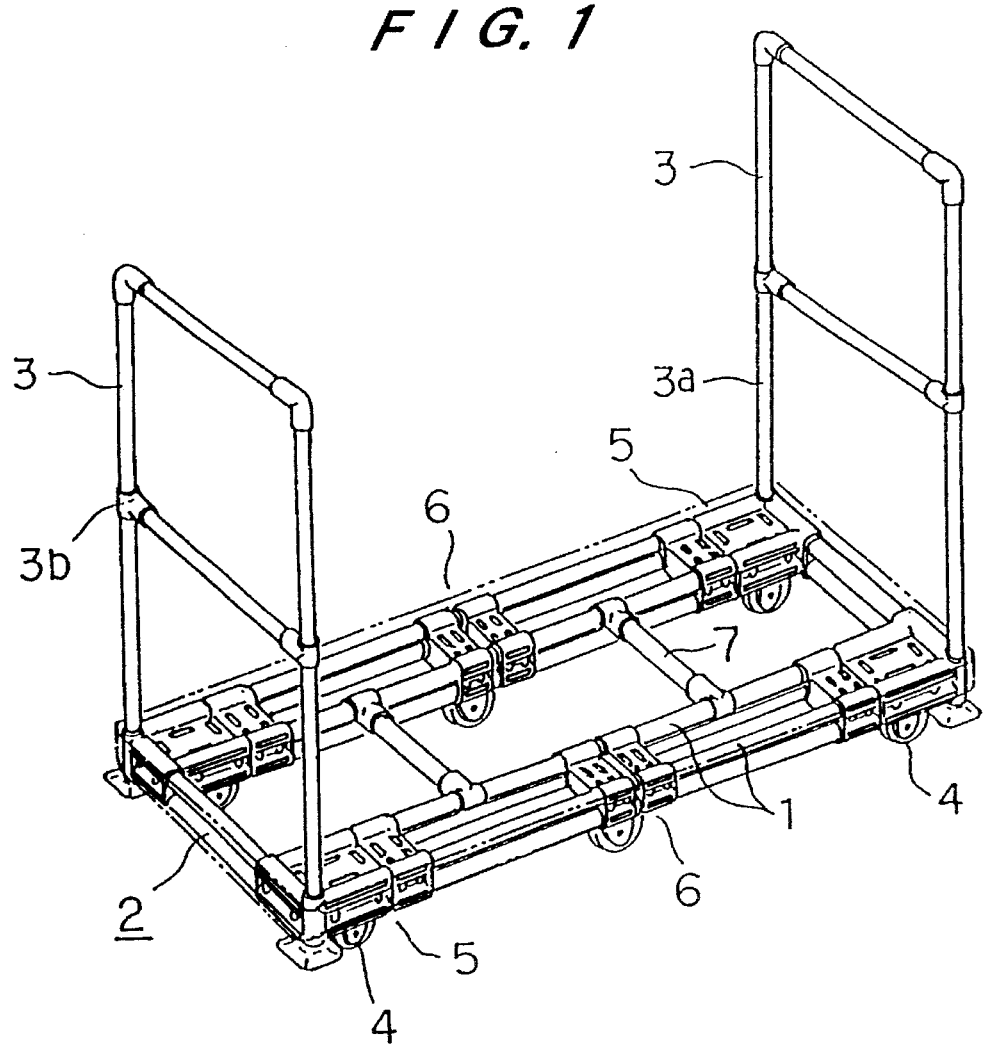
FIG. 1 is a perspective view of a double-handle six-caster platform truck employing the caster-mounting bases designed according to a first preferred embodiment of the present invention.
Figure 2:
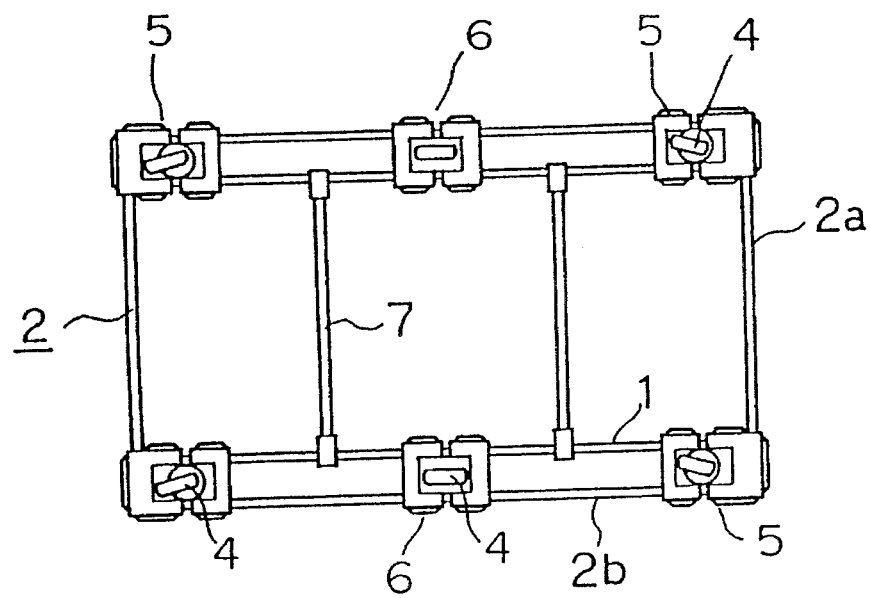
FIG. 2 is a plan view of the caster-mounting base of FIG. 1, as it is on the bottom of the platform framework.

Referring first to FIGS. 1 and 2, which both show the caster-mounting bases built according to a preferred embodiment of the present invention as they are mounted in a double-handle six-caster platform truck.

The platform truck in the drawings includes a largely rectangular platform framework 2 composed of elongate hollow crossbeams 1 disassemblably constructed to form the four sides of the framework. As best illustrated in FIG. 2, each of the longer sides 2b of the platform framework 2 may preferably comprise horizontally parallel spaced pairs of crossbeams 1.

The crossbeams in this particular embodiment are a steel pipe having B-shaped cross section (as can best be shown in FIG. 3). But this is a matter of choice, and a single steel pipe or a pair of steel pipes integrated with each other through any suitable fastening device to have the pair jointed together for more rigid structure, may also be used as well.

At the shorter sides 2a of the framework 2, a pair of largely inverted-U shaped handles 3 are provided to extend upward from the platform truck, as indicated in FIG. 1. Also, the trolley has six casters 4 at both ends and midpoint along either longer framework side 2b, interposed between the horizontally spaced row of crossbeams 1, for wheeling.

Of the six casters 4, the four that are located at opposite ends of the longer sides 2b may preferably be of the swivel type as can be best shown in FIG. 2. The remaining two, provided at midpoint of the longer framework side 2b may be of a non-swivel type.

Each of the swivel casters 4 is secured to the bottom of a mounting base 5, at either end of each longer framework side 2b of the framework 2. Also, each of the four end mounting bases 5 may preferably include a part that serves as a joint to connect crossbeams 1 at right angles to form perpendicularly intersected shorter and longer sides 2a, 2b. Thus, four joints at each corner of the framework 2 connect crossbeams 1 to make the rectangular shape of the framework 2. Likewise, each of the two side casters 4 in the middle of the longer framework sides 2b is fixed to a side mounting base 6 that is also interposed between the horizontal row of crossbeams 1, provided to smooth the rolling of the four corner casters.

A horizontal pair of reinforcing tubular members 7 are provided, spaced apart from each other, extending parallelly with the shorter framework sides 2a of the rectangular framework 2 on either side of the side mounting bases 6, to give added rigidity to the framework 2.

Figure 4:
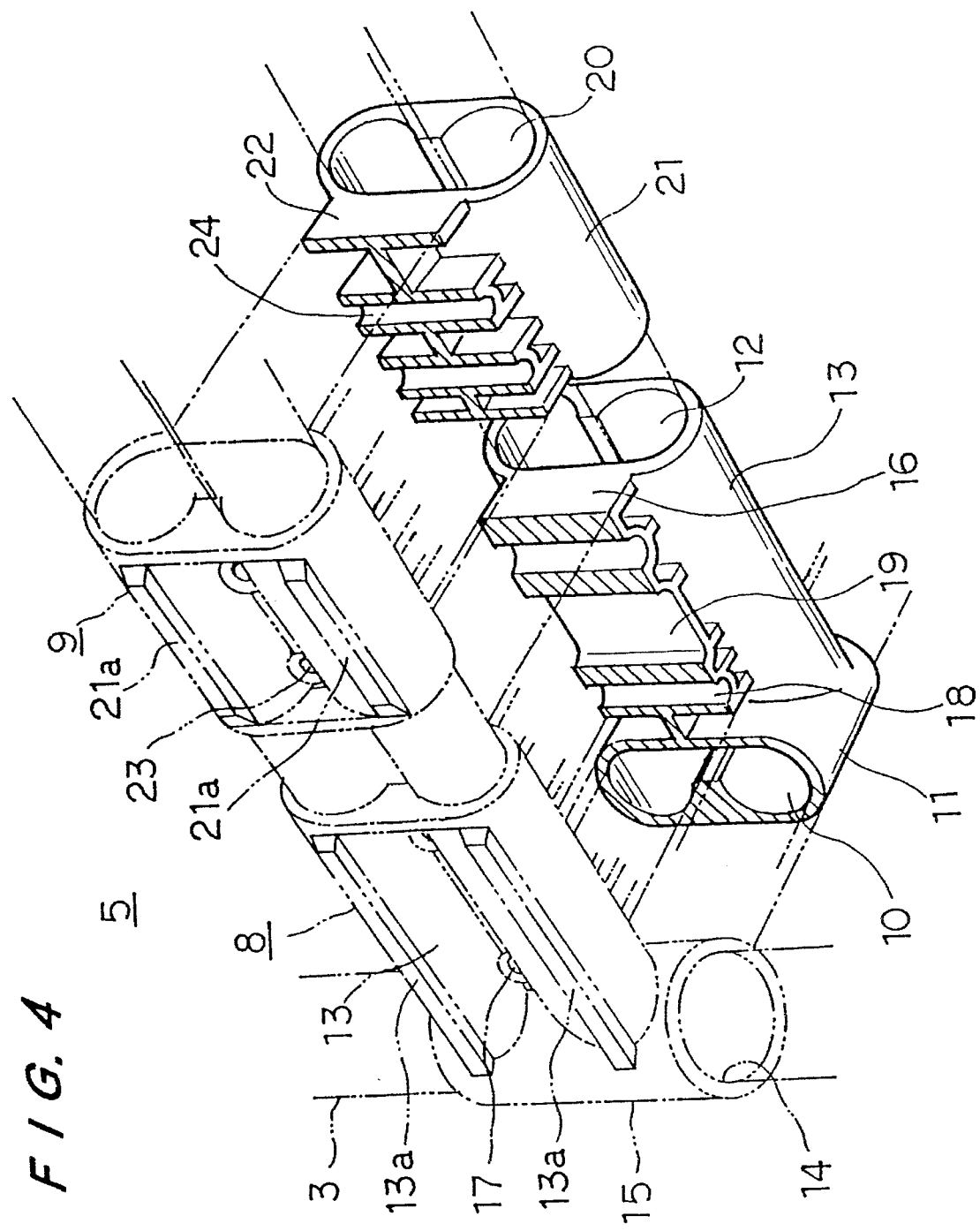
FIG. 4 is a broken-away, perspective view of the caster mounting base depicted in FIG. 3.
Figure 5:
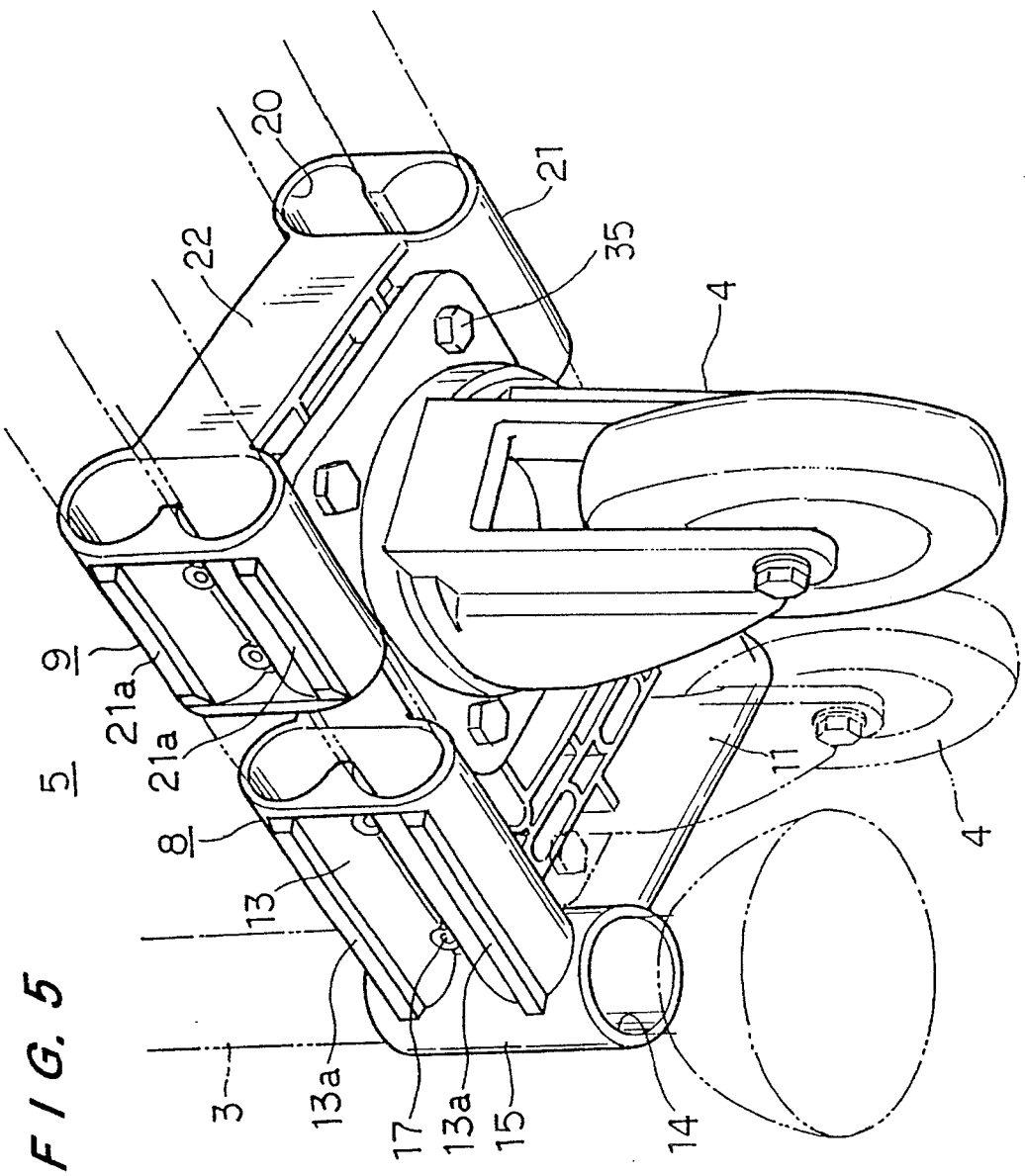

Referring then to FIGS. 3, 4 and 5, each end mounting base 5 may preferably be made of injection-formed engineering plastic, such as polyethylene terephthalate (PET). In addition, the end mounting base 5 comprises a fixed segment 8, which is closer to the base of the handle 3, and a slidable segment 9 which can be moved toward or away from its fixed counterpart.

The fixed segment 8 comprises a horizontally extending sleeve 11 having a mouth 10 of B-shaped cross section to removably receive therein ends of the vertical pair of tubular crossbeams 1 of each the longer framework side 2b, and a horizontally row of identical sleeves 13 that extend perpendicular with the sleeve 11. As shown in the drawings, the sleeves 13 each have a mouth 12 of B-shaped cross section to receive therein ends of the horizontal row of the vertical pair of tubular crossbeams 1 to form the longer framework side 2b.

Furthermore the fixed segment 8 has a vertical sleeve 15, situated where the longer framework side 2b intersects with its neighboring shorter framework sides 2a at the corners of the rectangular framework 2, which has a mouth 14 to removably receive therein a lower end of one of the vertical tubular members that form the handle 3. Also, provided in each mounting base 5 where the sleeve 11 and the sleeves 13 intersect is a caster-retaining block 16 in which the respective corner caster 4 is securely fitted.

In addition, the fixed segment 8 has a pair of elongate ribs 13a in horizontal rows, integrally formed with the segment to axially extend in the external sides of the sleeves 13 along the longer framework side 2b, provided to add reinforcement to the framework structure (in the drawings, the paired ribs 13a in the exposed side of the segment is shown). The sleeves also 11 have each another pair of similar ribs 11a, not shown, in the external side of the fixed segments 8 along the shorter framework side 2a.

Also, the fixed segments 8 have each a plurality of bolt holes 17, in either external side of the sleeves 13, preferably arrayed in a longitudinal row between the axial reinforcing ribs 13a, as illustrated in the drawings, each to receive a bolt to fasten the tubular crossbeams 1 of the longer framework sides 2b to the respective segment. Similarly, the fixed segment 8 has a plurality of bolt holes, now shown, in both external sides of the sleeve 11 to receive a bolt to fasten the tubular beam 1 along the shorter framework side 2a.

Each caster-retaining block 16, which virtually constitutes the bottom of the mounting base 5, is shaped like a honeycomb and has at least two pairs of elongated bolt holes 18 for bolts to attach a caster 4 to the block, laid out end-to-end in the direction perpendicular with the axis of the sleeves 13, as can best be shown in FIG. 3. The elongate bolt pairs are provided to offer a variable range of caster-bolt pitches, as will later be described in more detail.

Between the two pairs of bolt holes 18 is provided in the caster-mounting block 16 are an additional pair of elongated bolt holes 19 in the direction perpendicular with the bolt pairs 18. The bolt holes 19 are also provided for caster bolts, offering a variable range of bolt pitches.

The slidable segment 9 comprises a horizontally spaced row of sleeves 21 each having a mouth 20 of B-shaped cross section through which the row of tubular crossbeam pairs 1 of the longer framework side 2b are inserted into the aligned mouths 12 of the double-mouthed sleeve 13 in the fixed segment 8. Between the horizontally spaced row of sleeves 21 is interposed an auxiliary caster-retaining block 22, that is also honeycomb-pattern shaped similarly to the block 16 of the fixed segment.

In addition, the slidable segment 9 has in either external side thereof at least a pair of elongate ribs 21a in horizontal rows, integrally formed with the segment to extended in either external side of the sleeve 21 along each longer framework side 2b to give reinforcement to the platform framework structure.

Also, at least a pair of horizontally spaced bolt holes 23 are provided in the slidable segment 9, bored in a longitudinal row in the middle of the exposed side of each B-shaped cross-section sleeve 21. A bolt 27 is inserted into each bolt hole 23 to fix the slidable segment 9 to the tubular cross beams 1 of the longer framework sides 2b. The honeycomb-patterned caster-retaining block 22 also has at least two pairs of elongated bolt holes 24 for caster attaching bolts, arrayed end-to-end in the same direction as the paired bolt holes 18. The bolt holes 24 are provided for the same purposes as their counterparts 18 in the fixed segment 8.

The crossbeams 1 in the four sides of the framework 2 of two pieces 1a, 1b of steel pipe 28–32 millimeters in external diameter, vertically spaced and integrated with each other through snap-on fasteners preferably integrally formed with the surface of the mated pipes along their axial length, as can best be shown in FIG. 3.

The mounting base 5 is secured to the horizontal row of paired tubular crossbeams 1 in each longer framework side 2b through bolts 27 and wing nuts 26 (only a bolt and a nut are shown in FIG. 3) which are tightened through bolt holes 17 in the fixed segment 8 and holes 23 in the slidable segment 9 and aligned bolt holes 25 (only one hole is shown in the drawing) bored in the snap-on fasteners, after tubular crossbeams 1 are inserted in place into the B-shaped mouths of the sleeves 13 and 21.

In each mounting base 5, the slidable segment 9 is moved along the longer framework side 2b with respect to the mated fixed segment 8 to adjust the spacing of bolt hole pairs 18, 24 across their mounting blocks 16, 22 to accommodate the pitch of bolts 35 to attach a caster to the mounting base 5. In this way, adjusting the distance between the segments 8, 9, hence between the blocks 16, 22, can offer an adjustable range of caster-bolt pitches between the bolt hole pairs 18 and 24. Likewise, the bolt hole pair 19 also offers a variable range of bolt pitches spanned in the direction parallel with the axis of the sleeves 13.

Referring now to FIG. 6, the side caster-mounting bases 6 each comprise a pair of substantially identical slidable segments 28 similar in configuration to the segments 8 of the corner mounting bases 5. Each slidable segment 28 consists of a horizontally row of identical sleeves 30 each having a mouth 29 of B-shaped cross section and a caster-retaining block 31 in which a caster 4 is fixed.

Also, as in the slidable segment 8, at a longitudinal pair of reinforcing ribs 30a are provided in the slidable segments 28, formed in a horizontal row along the external circumference of the sleeves. Furthermore, the side mounting base 6 is also honeycombed in the bottom, and has at least two pairs of elongated bolt holes 33 bored in each slidable segment 28 for bolts attaching a caster to the segment pair 28, laid out end-to-end in the direction perpendicular with the axis of the sleeves 30. Moreover, the bolt holes 33 of the segments 28 are so designed to have one (leftside one in each segment in this drawing) of the bolt hole pairs 33 located off center 28 for reasons that will later be expounded.

The paired slidable segments 9 are moved along the longer framework side 2b, closer or farther away from each other to provide a variable range of bolt hole pitches to meet the pitch of bolts to attach a given caster to the mounting base 6.

Referring back to FIG. 1, the handles 3 are build by connecting elongate steel pipes with L-shaped and T-shaped joints 3b. The steel pipes may preferably measure a range of 28 and 32 millimeters in external diameter, coated with a synthetic resin such as Acrylate Styrene Acrylonitrile copolymer (ASA).

The casters 4 may preferably be made of the same engineering plastic as the one that makes the caster bases 5, 6. As illustrated in FIG. 5. With respect to FIG. 8, a caster 4 typically has an integrated rectangular attaching plate 4a with four bolt holes 34 through which bolts 35 are inserted to secure the caster 4 to the associated mounting base 5, 6 through elongated bolt holes 18, 19, 24, 33 in its retaining block 16, 22, 31.

In practice, there are only a limited number of sizes in casters 4 available in the marker for the mounting bases 5, 6 of a wheeled load carrier of known size. As illustrated in FIG. 8, a caster 4, selected for a given mounting-base size, may have the pitch of bolt holes 34 in its attaching plate 4a at P1 or larger, somewhere between P2 and Pn.

With respect to FIG. 7, to accommodate the size of a given caster 4, a suitable combination can be selected from the elongate bolt-hole pairs 18, 19, 24 in the caster-mounting base 5 (or bolt-hole pairs 33 in the mounting base 6), since the bolt-hole pairs 18, 24 offer a variable range of bolt pitches from a minimum distance T1 to T2, or to a maximum distance Tn, spanned in the direction perpendicular with the axis of the crossbeams 1. Likewise, there is a wide variable range of bolt pitches spanned in the direction parallel with the crossbeams 1, within or between the segments 8, 9, from a minimum distance S1 to S2 or to a maximum distance Sn.

Moreover, the spacing between even specific bolt-hole pairs can be adjusted by moving the slidable segment 9 with respect to its fixed counterpart 8.

Likewise, the above description about the adjustability of bolt-hole pitches is mostly applicable to the caster-attaching base 6 having two slidable segments 28. A further advantage available with the mounting base 6 is in the layout of bolt holes 33. As can be best shown in FIG. 9, the bolt pairs 33 are formed asymmetrically in the segment 28; the one is formed near the middle while the other is displaced to come close to the segment's edge. Thus, when the two segments 28 are assembled into the mounting base 6, the segments may be oriented to bring their displaced bolt-hole pairs to face for the nearest, farthest distance or intermediate distance.

In the drawing, the segments 28 have their displaced bolt-hole pairs 33 to oppose at the closest distance. In this way, the spacing of bolt-hole pairs across the segments 28 can be changed to meet the pitch of bolts to attach a caster, It is to be noted that the mounting bases of the invention can as well be used in other types of load carrying wheelers, such as stock trucks, works trucks, barrows, trolleys, though description here will be made in connection with a particular kind of load carrier.

In addition, the caster mounting bases may be made of metal by pressing. The crossbeams 1 may as well be made of steel treated by rust prevention or stainless steel, or other suitable material, and may not be tubular, provided the cross-section of the sleeves is changed to fit the crossbeam.

Furthermore, although the paired tubular crossbeams 1 in each framework side are coupled by snap-on fasteners integrated with their surface, this is a matter of choice. The paired crossbeams 1 may be connected by any other suitable means, such as bolts and nuts.

It will be easily understood from the above description that the corner caster-mounting block having a pair of fixed and slidable segments according to the present invention can accommodate a large number of caster sizes, because of the layout of bolt holes in the caster-mounting bloc, formed elongate to offer a wide adjustable range of bolt hole pitches. Further adjustment is obtained by simply changing the spacing of bolt holes between the segments, hence their pitch, through movement of the slidable segment relative to its fixed counterpart.

In addition, the same mounting block has at least two sleeves to receive therein ends of tubular crossbeams having mouths extending perpendicularly with each other, serving as a joint as well.

With the side caster-mounting block having a pair of slidable segments each having their elongate bolt holes laid out asymmetrically, also build in accordance with the invention, permits easy adjustment of bolt-hole pitches between the segments to accommodate a large number of caster sizes. This is done either by changing the spacing of bolt hole pairs by sliding either or both of the segments to come closer or farther away from each other or assembling them by laying one or either of the segments to bring their displaced bolt hole pairs to face at the closest or farthest distance.

What is claimed is:

1. A chassis of a cart having a plurality of downwardly depending casters wherein a part of the chassis may be adjusted to accomodate a variety of caster attaching means comprising:

first, second, third and fourth corner joints defining respective corners of the chassis;

each corner joint including two side-by-side first cylindrical parts, each of said parts having two insert openings that are substantially B-shaped in cross section, each of said cylindrical parts facing in an opposite horizontal direction;

each corner joint including a second cylindrical part having an insert opening that is substantially B-shaped in cross section and perpendicular to the first cylindrical parts;

first, second, third and fourth tubular frame members defining respective sides of said chassis;

said first and third tubular frame members each including four parallel tubular members fitted into respective oppositely facing cylindrical parts of two of said corner joints;

horizontal first connecting plates connecting each of said two side-by-side first cylindrical parts;

said second and fourth tubular frame members including double tubes, one below the other;

said first and third tubular frame members each having at least two adjustable horizontally slidable parts, wherein each of said slidable parts includes two side-by-side cylindrical portions having horizontal bores carrying a portion of said first and third tubular frame members therethrough, each of said adjustable slidable parts having a horizontal second connecting plate connecting said two side-by-side cylindrical portions;

at least four casters, each of said casters depending downwardly from a horizontal caster plate, said horizontal caster plate having a plurality of vertical bores therethrough;

each of said casters being mounted to each of said corner joints by said respective caster plate at an underside of said horizontal first connecting plate and an underside of said horizontal second connecting plate;

said horizontal first connecting plates having a plurality of vertical slots therethrough wherein at least two of said slots are adapted and constructed to be in vertical alignment with at least two of said Vertical bores of said caster plate;

said horizontal second connecting plates having a plurality of vertical slots therethrough wherein at least two of said slots are adapted and constructed to be in vertical alignment with at least two of said vertical bores of said caster plate;

each of said corner joints and said adjustable slidable parts being positioned whereby the caster plate bridges its respective corner joint to its respective adjustable slidable part whereby appropriate bores of the caster plate are in alignment with two slots of the said first connecting plate are in alignment with two slots of said second connecting plate and bolts are affixed through said bores and slots to affix a caster to at least each corner.

* * * * *